United States Patent [19]  
Potter

[11] 3,952,521  
[45] Apr. 27, 1976

[54] PORTABLE FLOATING WAVE TRIPPER
[76] Inventor: John M. Potter, 1828 S. Woodhouse Road, Virginia Beach, Va. 23454
[22] Filed: Oct. 29, 1974
[21] Appl. No.: 518,541

[52] U.S. Cl. .................................................. 61/5
[51] Int. Cl.² ........................................ E02B 3/06
[58] Field of Search ....................... 61/3, 4, 5, 1 F

[56] References Cited  
UNITED STATES PATENTS

| | | | |
|---|---|---|---|
| 2,658,350 | 11/1953 | Magill | 61/5 |
| 3,309,876 | 3/1967 | Potter | 61/3 |
| 3,473,335 | 10/1969 | Launer | 61/5 |
| 3,724,221 | 4/1973 | Cool | 61/3 |
| 3,785,159 | 1/1974 | Hammond | 61/5 |
| 3,844,125 | 10/1974 | Williams | 61/3 |

FOREIGN PATENTS OR APPLICATIONS

| 826,383 | 11/1969 | Canada | 61/5 |
|---|---|---|---|

Primary Examiner—Paul R. Gilliam  
Assistant Examiner—David H. Corbin  
Attorney, Agent, or Firm—Jones, Tullar & Cooper

[57] ABSTRACT

A floating breakwater or wave tripper supported by pontoons or floats is disclosed. The breakwater is useable for moderating waves and for creating a generally calm surface on the water behind the breakwater. Since the device is carried by floats or pontoons, it is portable and may be moved and positioned as desired. The pontoons or floats which support the breakwater are so shaped that the device cuts through waves striking it instead of floating over them, and is therefore more effective in reducing the height of incident waves than are prior devices which float on the surface of the wave. Suitable anchors are provided to secure the device in a desired location and a plurality of wavebreakers may be joined together to form a portable breakwater of generally any desired length.

5 Claims, 5 Drawing Figures

PORTABLE FLOATING WAVE TRIPPER

FIELD OF THE INVENTION

The present invention is directed generally to a floating breakwater or wave tripper. More particularly, the present invention is directed to a floating breakwater wherein the device is carried by a plurality of spaced pontoons floats and rides substantially at the surface of the water. Most specifically, the present invention is directed to a floating breakwater or wave tripper in which the shape and location of the pontoons or floats supporting the device is such as to cause the breakwater to cut into and pass through incident waves instead of riding up and over such waves, thereby acting to substantially reduce the amplitude of the waves in order to create an area of relatively calm water behind the device.

The wave tripper of the present invention is comprised generally of a series of upstanding A frames which carry thereon a plurality of elongated bars on channels. These bars are spaced apart from each other and provide a structure which waves will pass. The assembly of A frames and bars is floatably carried by spaced, elongated pontoons or floats which are so shaped that the pontoons or floats and hence the wave breaker cuts through the waves striking it instead of floating over these waves, thereby acting effectively to greatly reduce the amplitude of the waves. The device is anchored in any desired location by suitable anchor means and several of the units may be joined together to form a portable breakwater of generally any desired shape and length to be adaptable to various shoreline or harbor configurations.

DESCRIPTION OF THE PRIOR ART

Floating breakwaters are known generally and have existed for many years. The various devices have as their purpose that of reducing the amplitude or magnitude of water waves to provide in area of generally calm water behind themselves so that there is provided a calm harbor, work area, or beach. Recently, floating wave breakers have been suggested for useage in conjunction with offshore installations such as oil drilling plateforms and the like to provide a generally calm working area.

Obviously, where the water is quite shallow, it is feasible to construct a seawall or breakwater which is built up from, and supported by, the ocean or lake bottom. However, in areas where the water is not conveniently shallow or where it is desired to have an installation that may be moved and relocated, the use of floating breakwaters has become the practical solution.

The prior art is replete with examples of portable breakwaters and floating seawalls, but these prior devices have suffered from a number faults. While a few of the devices are simple in construction, the majority are not. Any number of rather complex structures have been utilized in an attempt to provide a portable or moveable breakwater which is effective in reducing the amplitude of incident waves. For instance, the use of clusters of hollow pipes or tubes placed anywhere from generally parallel with, to perpendicular to, the surface of the water have been employed. Alternatively, there are a number of devices in which vanes or plates are placed at various angles to oncoming waves. Ultimately however, all have suffered from several failings. The structures which depend on attempting to cause the waves to follow a tortuous path through the device are subject to being clogged or blocked by floating material carried by the waves. Floating vegetation and trash must be removed periodically from these tubes, pipes, vanes and the like. Such removal is not only expensive but is often also hazardous. These rather complex assemblies are also often quite costly to build since the fabrication of properly curved vanes and the like is time consuming and expensive.

To be effective in reducing the amplitude of the waves incident upon the device, the breakwater or seawall must cause the wave to pass through it. Any combination of pipes, tubes, vanes and the like will not serve to reduce the size of the wave if the wave can pass under the device instead of through it. If the purported wavebreaker floats on the surface of the water, it will be carried up and over the wave, thereby allowing the wave to continue on substantially undiminished in size. This then is the primary failing of the prior devices. They have not been capable of cutting through the wave, but instead have been carried up and over the wave.

One attempted solution to this problem has been to anchor the devices in such a way that there will be insufficient slack in thee anchor line to allow the device to rise and fall on the waves. However this solution is not practical either because the depth of the water in which the wave breaker is placed varies with tidal fluctuation, or varies with seasonal water depth changes, or alternatively, because the sheer weight of the anchor required when there is no scope in the anchor line results in such a heavy anchor being required that these devices are not portable and cannot be moved from place to place.

For the above reasons, prior floating breakwaters or seawalls have not been particularly effective in reducing the amplitude of incident waves and and have thus met with little success.

SUMMARY OF THE INVENTION

It is an object of the present invention to provide a floating wave breaker or wave tripper which overcomes the deficiencies of the prior devices.

It is a further object of the present invention to provide a floating wave tripper which is portable or moveable from place to place.

Yet an additional object of the present invention is to provide a floating wave breaker which is uncomplicated in construction.

Still a further object of the present invention is to provide a floating wave tripper which cuts through waves incident upon it and which not ride over the surface of the waves.

The wave tripper of the present invention is generally of the same type as the devices of the prior art in that it is intended for use in areas where the water depth is too great to allow the construction of a static seawall. Accordingly, the present device floats generally at the surface of the water and is anchored in position. Several units may be joined together and anchored to provide a wave breaker of any desired length and configuration.

Where the prior devices ae characterized by their complicated tubes, pipes, vanes and the like, the wave tripper of the present invention is charcterized by its uncomplicated structure. As will be described more fully hereinafter, a number of generally A-shaped vertical frames are secured, in a spaced relationship, by several elongated horizontal bars, channels, rods or the like. A plurality of similar bars or rods are affixed to the sides of the A members and are spaced from each other to allow the waves to pass therethrough. This construction is not only uncomplicated and hence less expensive than various of the prior devices, but is also less apt to be subject to accumulation of floating vegetation and debris and, accordingly, does not demand the time consuming and hazardous cleaning which the prior devices are subject to. Since the waves do not pass through a particularly tortuous path but instead are broken up by their impact against the bars or rods, the wave breaker of the present invention is essentially self-cleaning.

In contrast to the prior devices, the present breakwater or wave tripper is constructed to cut through the waves moving against it instead of being carried up and over the waves. The A frames which are the basic structural elements of the device are either secured to exterior pontoons which support the device or carry float tanks within the structure. As will be discussed more fully hereinafter, these pontoons are float tanks are of such a shape and give the wave tripper a suitable buoyancy so that the device, instead of being carried up and over a wave, will cut through the wave, thus dissipating it and reducing its amplitude, causing the water behind the breakwater to be relatively calm.

Because the wave tripper of the present invention cuts through the waves instead of floating over them, the use of overly heavy anchors is not required. While the anchoring means must be sufficient to retain the breakwater in its desired location, this may be accomplished by using an anchor of moderate weight and an anchor line of sufficient length that the pull on the anchor will be generally horizontal instead of vertical. Hence the anchoring means will not be of such a large weight that it cannot be raised and handled when the wave tripper is to be moved to a new location.

The wave tripper of the present invention is effective in reducing the size of waves incident thereupon while remaining simple and inexpensive and having anchoring means light enough to allow the device to be moved from one location to another when desired.

BRIEF DESCRIPTION OF THE DRAWINGS

While the novel features of the present invention are set forth with particularity in the appended claims, a full and complete understanding of the wave tripper of the present invention may be had by referring to the description of a preferred embodiment as set forth hereinafter and as is seen in the accompanying drawings in which:

DESCRIPTION OF A PREFERRED EMBODIMENT

Figure 1:
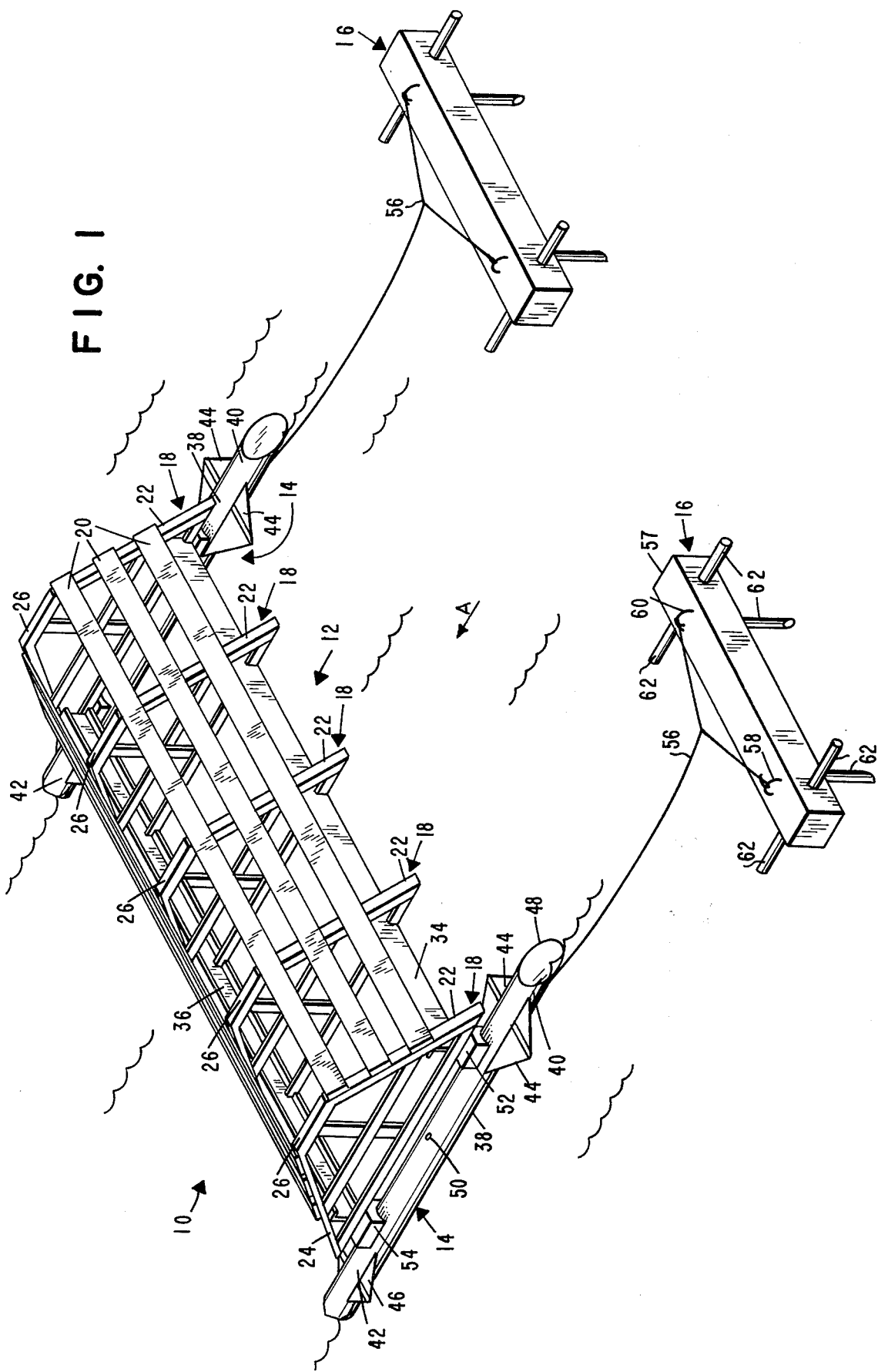
FIG. 1 is a perspective view of a preferred embodiment of a wave tripper in accordance with the present invention.

Referring now to FIG. 1, there is shown generally at 10 a preferred embodiment of a portable wave tripper or breakwater in accordance with the present invention. Wave tripper 10 is comprised generally of a wave breaking panel structure 12, a plurality of support pontoons 14 which support panel structure 12, and a plurality of anchors 16 for use in retaining wave tripper 10 in place.

As may be seen in FIG. 1, breaker panel structure 12 is formed of a plurality of generally A-shaped members 18 which are joined to each other in a spaced apart relationship by a plurality of elongated breaker bars generally indicated at 20.

Figure 2:
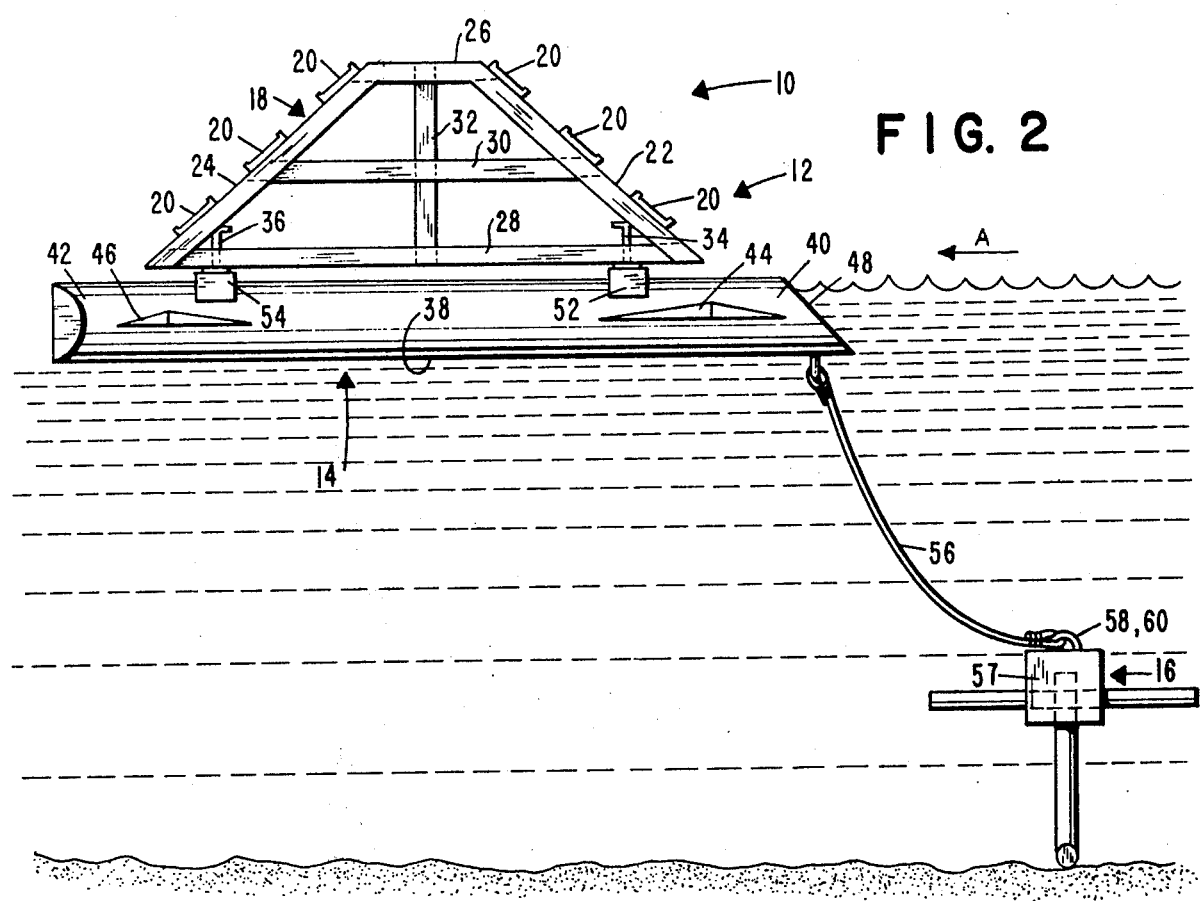
FIG. 2 is a side elevation view of the wave tripper of FIG. 1.

Each support 18 is, as may be seen most clearly in FIG. 2, generally A-shaped and has upwardly extending side legs 22 and 24 and a generally horizontal top bar 26. Support legs 22 and 24 slope inwardly as they approach top bar 26, thereby giving support 18 its generally A or trapazoidal shape. Legs 22 and 24 and top 26 may be made of any suitable material such as 4 × 4 × ½ inch. or ⅜ inches angle steel or other suitable structural shapes such as channels or beams so long as they have sufficient structural rigidity to be able to withstand the force of waves breaking against the tripper 10, it being understood that the size of the materials used will vary in accordance with the expected severity of the waves.

Each A-shaped support 18 includes, as may be seen in FIG. 2, a base stiffening web 28, an intermediate stiffening web 30 and a center support web 32. Base stiffening web 28 is attached to the lower ends of side legs 22 and 24, extending therebetween, and is generally parallel to top bar 26. Intermediate web 30 is attached to side legs 22 and 24, extending therebetween, and is generally parallel to web 28 and top 26. Center support web 32 extends downwardly from the midpoint of top bar 26, is perpendicular thereto, and terminates at lower web 28. While this arrangement of webs is preferred as it adds structural rigidity to A-shaped support 18, it is to be understood that this particular arrangement of webs is to be taken as exemplary of any number of arrangements of stiffening webs which could be used to provide the necessary rigidity.

Referring again to FIG. 1, it may be seen that breaker panel structure 12 is formed by spacing a plurality of A-shaped supports 18 from each other and by then affixing a plurality of elongated breaker bars 20 to the side legs 22 and 24 of each of the A-shaped supports 18. As may be seen in FIG. 1, supports 18 are generally parallel to each other and are positioned generally vertically. The breaker bars 20, which may be steel channels or the like, are also disposed generally parallel to each other and are generally perpendicular to side legs 22 and 24. While in FIG. 1 there are shown three such spaced apart breaker bars 20 attached to each leg 22 and 24, this is exemplary of any of a number of arrangement which may be used so long as spacing is maintained between the breaker bars 20 to allow waves, moving generally in the direction of arrow A, to pass through the wave breaker panel 12. These breaker bars 20 are, in a preferred embodiment, 10 inches channels sections which are spaced 10 to 12 inches apart from each other. In the preferred embodiment, panel 12 has a length of approximately 20 feet and five A-shaped support 18 are provided and are spaced five feet from each other. A pair of elongated, generally horizontal support beams 34 and 36 are, as may be seen in FIGS. 1 and 2, carried at the lower portions of side legs 22 and 24 respectively, and serve to attach breaker panel 12 to pontoons or floats 14.

Figure 3:
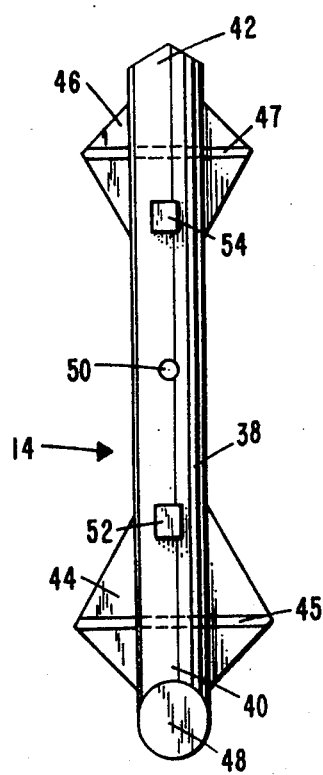
FIG. 3 is a top plan view of a support pontoon of the wave tripper in accordance with the present invention.

As may be seen in FIG. 1, pontoons 14 are located exteriorly to and at the ends of breaker panel 12 and are generally perpendicular to support beams 34 and 36 and head into the direction of wave movement, such direction being shown by arrow A. Each such pontoon or float 14 is watertight, thereby providing a float for supporting breaker panel structure 12 generally at the surface of the water upon which wave tripper 10 floats. As may be seen in FIG. 3, each pontoon 14 has a generally cylindrical body 38 which extends from a forward end 40 to a rear end 42. Pontoons 14 could also be square, rectangular, oval or the like in cross-sectional shape if desired, so long as they provide adequate floatation for breaker panel 12. Pairs of horizontally extending front and rear fins 44 and 46, respectively are affixed to body 38 of pontoon 14 adjacent pontoon 14's front and rear 40, 42 respectively. Fins 44 and 46, which may be in the shape of flat plates or may have slightly curved surfaces, are secured to pontoon 14 by a pair of bars or channel members 45 and 47, respectively, which pass through the body of pontoon 14, as may be seen in FIG. 3. These bars 45 and 47 aid in securely attaching the fins to the pontoons so that the fins 44, 46 will not bend or twist when subjected to wave action. The forward end 40 of pontoon 14 is provided with a forwardly extending beveled or angled front face 48 having a slope from 45° to 60°. The purpose of this angled face 48 and of fins 44 and 46 will be set forth hereinafter together with the use of a removable plug 50 positioned at the upper central portion of pontoon 14 and comunicating with the hollow interior of the pontoon.

Pontoons 14 are provided with suitable mounting blocks 52, 54 which are placed on the upper portion of cylindrical body 38 of pontoons 14. These mounting blocks are provided with suitable mounting means such as upwardly projecting threaded studs (not shown) which pass through suitable apertures (not shown) in support beams 34 and 36 thereby providing a means for securing breaker panel structure 12 to pontoons 14. Alternatively, pontoons 14 may be secured to breaker panel structure 12 by being directly attached to the lower protions of side legs 22 and 24 of A-shaped supports 18 by any suitable means (not shown). Any suitable means of connecting pontoons 14 to the breaker panel may be used so long as the pontoons are securely attached and will not be dislodged by the action of waves hitting the breaker panels.

A suitable anchor 16 is secured to, for example, the forward end 40 of each pontoon 14 by a cable 56 which is attached by suitable means (not shown) to pontoon 14 and passes through a pair of rings 58, 60 on anchor 16. The anchors 16 may, alternatively, be attached to the forward or wave side of breaker panel structure 12 itself by any suitable means. Again, in the connection of the pontoons to the breaker panel, the specific means used to attach the anchors to the wave tripper is not critical so long as the connection has sufficient strength to withstand the force of the waves striking the device. Anchor 16 has, as may be seen in FIGS. 1 and 2, a generally rectangular elongated body 57 and may be formed of reinforced concrete or a similar heavy material. A plurality of stabilizer pipes 62 external outwardly from the anchor's body 57 and serve to prevent anchor 16 from rolling or being dragged along the bottom when wave tripper or breakwater 10 is struck by waves. While not specifically shown, it will be understood that the length of anchor cable 56 will be sufficient that the pull on anchor 16 will be generally horizontal when wave tripper 10 has been deployed, thereby keeping the weight of anchor 16 at a minimum.

In use, wave tripper 10 is towed to the desired location by a boat, such towing being facilitated by the fact that wave tripper 10 floats on pontoons 14. When the tripper 10 is in position, the anchors are deployed, the length of anchor cable 56 adjusted and the buoyancy of tripper 10 observed. Since the device is intended to function by cutting through waves incident upon it instead of floating up and over such waves, the device is intended to be situated in the water at a depth that fins 44 and 46 on pontoons 14 are located below the surface of the water when the device is at rest. To facilitate such positioning, ballast such as water may be either placed in or removed from pontoons 14 through plug 50. It will be understood that the interior or pontoons 14 contain suitable baffles or flow restriction (not shown) so that such ballast placed within the pontoon will not be displaced to either one end or the other of the pontoon by wave motion.

After the buoyancy of the wave tripper 10 has been adjusted so that fins 44 and 46 on pontoons 14 are below the surface of the water, the tripper is ready for use. A wave moving toward the tripper in the direction shown by arrow A will strike the elongated breaker panel 12 and the wave will be substantially reduced in magnitude. Because wave tripper 10 is floating generally on the surface of the water, its natural tendency would be to ride on the surface of the wave, not causing much reduction in the wave's size. However, fins 44 and 46 and angled or beveled front face portion 48 of pontoon 14 prevent such riding of tripper 10 over the surface of the wave and act to force the wave tripper to cut through the wave, thereby causing the wave to strike and pass through breaker panel 12 and hence to be dissipated. Since the pontoons 14 are rigidly secured to the breaker panel 12, there is little chance of the pontoons becoming dislodged or twisting to a location where fins 44 and 46 and front face 48 would not act to hold the pontoon in the wave. As may be seen in FIG. 2, the rear 42 of pontoon 14 has vertical, inwardly tapering sides which act as a rudder to keep the wave tripper angled into the waves. Thus once the tripper has been deployed and anchored, and its buoyancy adjusted, it will function effectively to break up waves incident upon it. It will be recognized that a number of similar wave tripper units could by deployed and interconnected to form a portable breakwater of generally any desired length.

Figure 4:
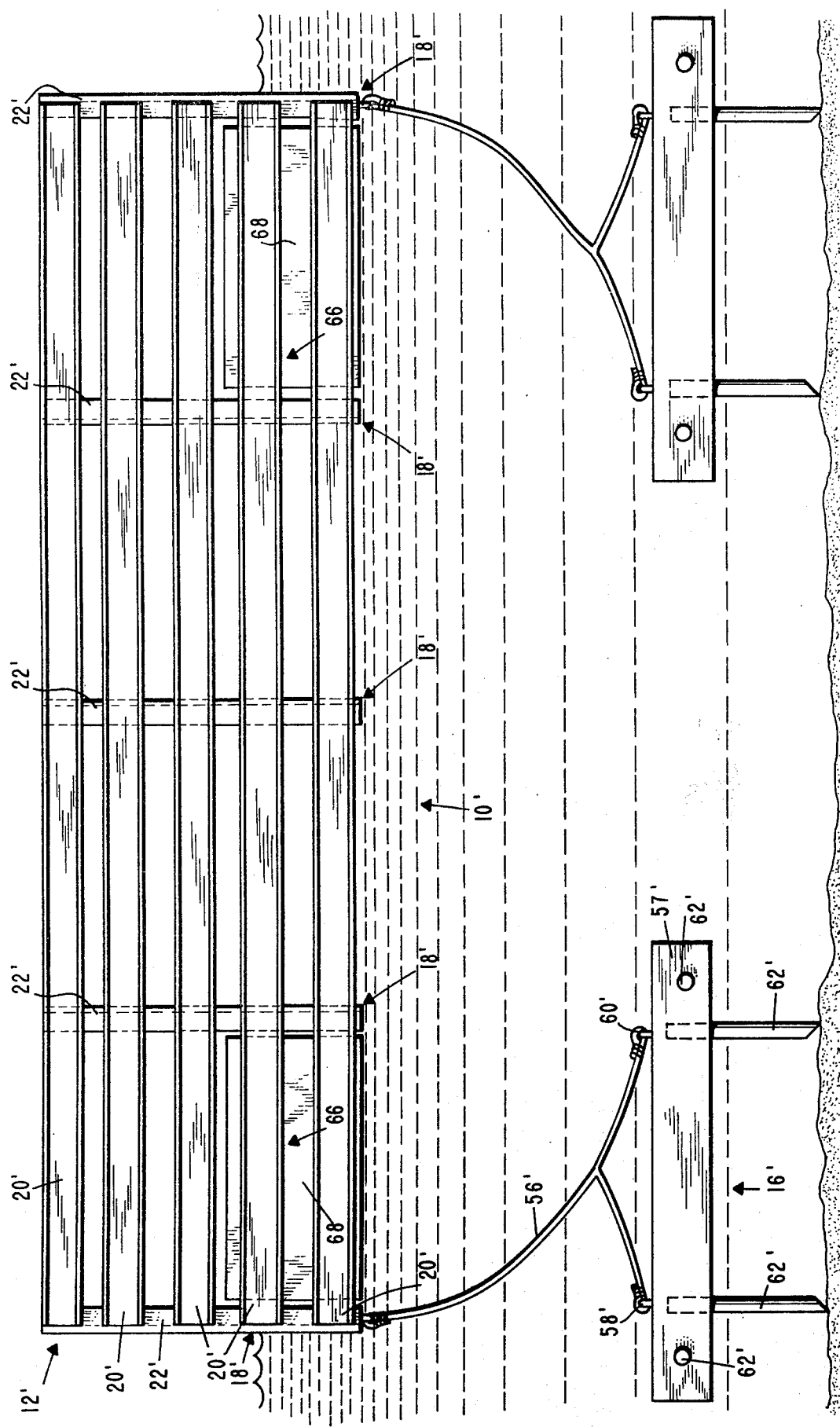
FIG. 4 is a front elevation view of a modified wave tripper in accordance with the present invention.
Figure 5:
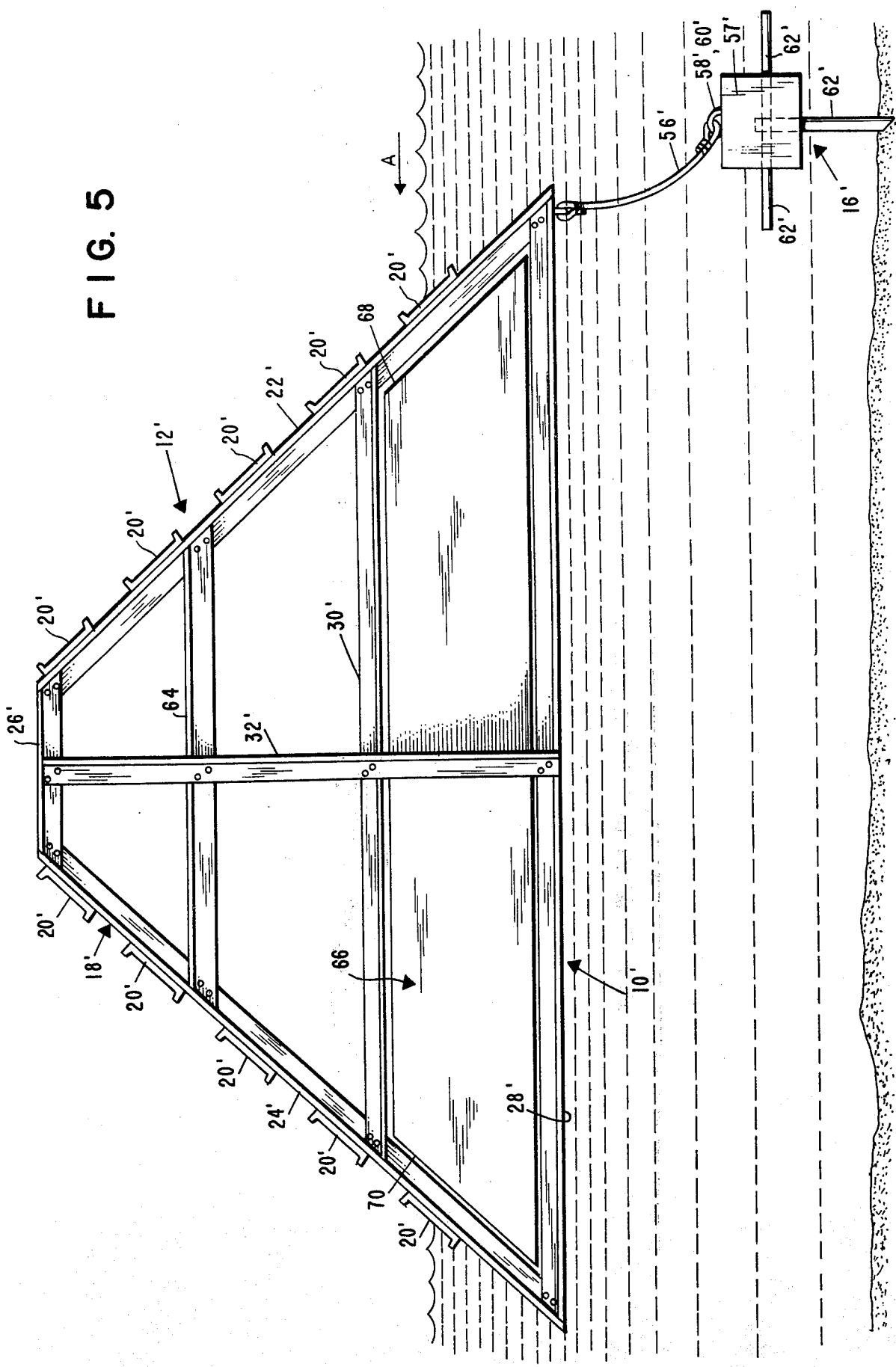
FIG. 5 is a side elevation view of the modified wave tripper of FIG. 4 and shows the support float tank used to support the tripper of FIGS. 4 and 5.

Turning now to FIGS. 4 and 5, there may be seen generally at 10' an alternate construction of a wave tripper in accordance with the present invention. As will be recognized, this device is generally similar to wave tripper 10 as described hereinabove and, accordingly, corresponding elements of tripper 10' are indicated with primed numbers.

As may be seen in FIGS. 4 and 5, wave tripper 10' is formed of a plurality of A-shaped supports 18' which consist of side legs 22' and 24' and top bar 26'. Each A-shaped support 18' also includes a base stiffening web 28' a first intermediate stiffening web 30', a center support web 32' and further includes a second intermediate stiffening web 64. This second web 64 is added since A support 18' is larger than corresponding support 18.

As may be seen in FIGS. 4 and 5 a plurality of breaker bars 20' are secured to the legs 22', 24' of A support 18'. Again, since tripper 10' is larger than its counterpart of FIGS. 1 and 2, there is shown the use of more breaker bars 20' in tripper 10'. However this positioning and purpose is the same as the corresponding bars 20 in tripper 10. Suitable anchors 16' are secured to tripper 10' in the same manner as those of tripper 10 and are intended to perform the same function i.e. to hold tripper 10' in place.

The difference between trippers 10 and 10' is not in the structure of the breaker panels 12 and 12', but rather in the location of the means employed to float the device. As may be seen in FIGS. 4 and 5, tripper 10' does not have exterior pontoons corresponding to pontoons 14 of tripper 10 but instead is provided buoyancy by a pair of interior pontoons or float tanks 66. These floats tanks or pontoons are generally rectangular in cross-section and, as may be seen in FIG. 5, each have a forward end 68 and a rear end 70. These forward and rear ends 68, 70 have sloping faces of generally the same slope as that of side legs 22' and 24', respectively. Float tanks 66 are secured at either end of breaker panel structure 12', interiorly of the outermost A supports 18'. Although not specifically shown, it will be understood that float tanks or pontoons 66 are secured within breaker panel structure 12' by any conventional means so that the tanks do not move within the breaker panel structure when wave tripper 10' is subjected to wave action.

In use, wave tripper 10' is towed to its desired location by a boat and is anchored in placed by anchors 16'. Again, as with wave tripper 10, wave tripper 10'then has its buoyancy adjusted so that at least a portion of float tanks 66 are below the water. This adjustment is accomplished in a manner similar to that used with pontoon 14 of tripper 10, i.e. by either adding or removing ballast such as water in float tank or pontoon 66 through a suitable plug (not shown) in the top of tank 66. Again, tank 66 may be provided with interior baffling means (not shown) to prevent surging of the ballast within the tank due to motion of the wave tripper 10' caused by its being struck by waves.

Since front face 68 of tank 66 slopes upwardly similarly to front face 48 of pontoon 14, it angles into the oncoming wall of water, thereby causing the wave tripper 10' to cut into and through the waves instead of riding up and over them. Because wave tripper 10' does cut through the waves, the waves are forced to break against, and then pass through breaker panel structure 12' and are therefore substantially reduced in size. It will also be obvious that several wave trippers 10' may be joined together by any suitable means to, as was the case with wave tripper 10, form a portable breakwater of generally any desired length.

Should it be desired to relocate either of the above-described breakwaters, this may be accomplished by removing any ballast from pontoons 14 or float tanks 66, pulling up the anchors and merely towing the units to their new location.

The wave tripper of the present invention is quite simple in construction and is hence inexpensive, is portable so that it can be installed where it is needed yet still be moveable to a new location, and is more effective in reducing the size of waves striking it than are prior devices due to its ability to cut through the waves instead of riding up and over such waves as is the situation with the prior devices. In addition, the wave tripper of the present invention is not easily fouled with floating marine vegetation and debris and, accordingly, requires little maintenance or servicing when in use.

It will be seen that a preferred embodiment of a portable wave tripper or breaker in accordance with the present invention has been hereinabove fully and completely described. However, it will be obvious to one of skill in the art that a number of changes and modifications may be made in, for example, the materials used to construct the breaker panel structure, i.e. steel, concrete, fiberglass and the like; the material used to construct the pontoons or float tanks; the shape of the pontoons and float tanks; the placement of the fins on the pontoons; the height and width of the tripper units; the spacing of the stiffening webs and breaker bars; and the means used to anchor the tripper in place may be made without departing from the spirit of the invention and accordingly the scope of the invention is to be determined only by the following claims.

I claim:

1. A portable wave tripper or breakwater adapted for floating in a body of water and for use in reducing the size of waves in the water striking said wave tripper, comprising:
    a plurality of spaced apart, generally vertical A-shaped supports;
    a plurality of elongated spaced breaker bars secured to and extending generally horizontally between said supports to form a breaker panel;
    at least two hollow, elongated, spaced pontoons attached to said breaker panel generally perpendicular to the waves for floatably supporting said breaker panel in the water, each said pontoon having a forwardly projecting angled front face, each said pontoon further having a plug so that ballast may be added to or removed from said pontoons whereby the buoyancy of each said pontoon may be adjusted whereby said front face of each said pontoon is positioned at least partly beneath the surface of the water so that the waves striking said wave tripper are caused to flow over said pontoons thereby causing said wave tripper to cut through the waves; and
    means securing said wave tripper at a desired location in the water.

2. The wave tripper of claim 1 wherein said pontoons are secured to said breaker panel exteriorly of said A-shaped supports.

3. The wave tripper of claim 1 further wherein spaced apart outwardly extending horizontal fins are secured to each of said pontoons, the buoyancy of said pontoons being adjusted so that said fins are positioned beneath the surface of the water whereby said fins cause said pontoons to cut through the waves striking said wave tripper.

4. The wave tripper of claim 1 wherein said pontoons are secured to said breaker panel interiorly of the outermost of said A-shaped supports.

5. The wave tripper of claim 4 wherein each said pontoon further includes an upwardly, inwardly sloping rear face.

* * * * *